United States Patent [19]

Rapeli

[11] Patent Number: 6,058,261
[45] Date of Patent: May 2, 2000

[54] RF CHANNEL SIMULATOR

[75] Inventor: Juha H. A. Rapeli, Oulu, Finland

[73] Assignee: Nokia Mobile Phones Limited, Espoo, Finland

[21] Appl. No.: 08/330,265

[22] Filed: Oct. 27, 1994

[30] Foreign Application Priority Data

Oct. 29, 1993 [FI] Finland ........................... 934814

[51] Int. Cl.[7] ........................... G06F 17/50
[52] U.S. Cl. ........................... 395/500.27; 395/500.23
[58] Field of Search ........................... 364/578; 375/200; 455/52.3, 506; 395/500, 304, 500.27, 500.23, 500.26

[56] References Cited

U.S. PATENT DOCUMENTS

| | | | |
|---|---|---|---|
| 3,633,107 | 1/1972 | Brady | 375/267 |
| 4,607,375 | 8/1986 | Lee | 380/32 |
| 4,658,436 | 4/1987 | Hill | 380/31 |
| 4,737,928 | 4/1988 | Paul et al. | 364/502 |
| 4,977,607 | 12/1990 | Maucksch et al. | 455/10 |
| 5,062,148 | 10/1991 | Edwards | 455/52.3 |
| 5,191,594 | 3/1993 | Ango et al. | 375/200 |

FOREIGN PATENT DOCUMENTS

| | | |
|---|---|---|
| 0 371 286 | 6/1990 | European Pat. Off. . |
| WO 93/20626 | 10/1993 | WIPO . |

OTHER PUBLICATIONS

Roux Pierre, "Computed Signatures for Digital Radiolinks with Adaptive Devices", IEEE, 1988, pp. 1651–1657.

Chennakeshu et al., "Decision Feedback Equalization for Digital Cellular Radio," IEEE, 1990, pp. 1492–1496.

Narasimhan et al., "An Adaptive Lattice Decision Feeback Equalizer for Digital Cellular Radio," IEEE, 1990, pp. 662–667.

Finnish Office Action and Translation thereof dated Jul. 29, 1994 Application No. 934814, Nokia Mobile Phones Ltd No English Translation.

Patent Abstracts of Japan, vol. 8, No. 217, (E–270) (1654) Oct. 4, 1984, JP–A–59101938.

*Primary Examiner*—Kevin J. Teska
*Assistant Examiner*—Thai Phan
*Attorney, Agent, or Firm*—Perman & Green, LLP

[57] ABSTRACT

The present invention relates to a method and a simulator for simulating an RF channel between a radio transmitter and a radio receiver located at a far distance from one another, in which radio channel multipath propagation occurs, and with which simulation at least part of the phenomena caused by the multipath propagation to the radio signal, such as delay spread, attenuation and Doppler shift are implemented. As taught by the method, an RF signal ($f_{in}$) is moved to a lower frequency ($f_{IF}$), and from said lower frequency signal ($f_{IF}$) thus produced samples are taken and written in a memory at a predetermined write frequency ($f_w$). The stored samples are read from the memory after a period of time of the length of the propagation delay ($t_{Di}$) of each propagation path (i) to be simulated from the storage in the memory at a read frequency ($f_{Pi}$) predetermined for each propagation path (i) to be simulated, said read frequency differing from the write frequency ($f_w$), when the frequency difference ($\Delta f_{o1}$) of said write frequency ($f_w$) and the propagation-specific read frequency ($f_{Ri}$) represent the Doppler shift of the frequency occurring in each propagation path (i).

19 Claims, 6 Drawing Sheets

RF CHANNEL SIMULATOR

FIELD OF INVENTION

The present invention relates to a method and apparatus for simulating an RF channel between a radio transmitter and a radio receiver.

BACKGROUND OF INVENTION

A radio signal transmitted from or to a mobile or portable telephone is affected by a number of factors. For instance, the power of a radio signal transmitted from an antenna decays as a function of the distance from the transmitter. In addition, there are usually obstacles In the radio signal transmission path such that radio waves may partly be obstructed or absorbed by the physical environment around the propagation path. A radio wave may also be reflected from the terrain, fixed or mobile objects in the propagation path, such as vehicles, or from a discontinuity in the atmosphere. In certain instances, a reflected signal is significantly attenuated whereas in some other instances most of the radio energy is reflected, and only part is absorbed. Such reflections generates a plurality of different propagation paths for the radio signal between a transmitter and a receiver, and this phenomenon is called multiple road propagation (or multipath propagation). The reflection and the multipath propagation give rise to the "bending" of radio waves around corners and the propagation beyond hills and buildings becomes possible, as well as into multilevel car parks and tunnels.

Multipath propagation causes very difficult problems in the vicinity of a mobile phone. Three main problems being the delay spread of the received signal, the Rayleigh fading caused in the strength of a received signal by varying phase shift between different paths and the varying frequency modulation due to the Doppler shift between various propagation paths. The first mentioned phenomenon is due to the fact that since the propagation path of the reflected signals is longer than the direct path (from the transmitter to the receiver, e.g. from the base station to the mobile station) which gives rise to signal delays. Since various paths lead to slightly different arrival times, the signal spreads. Rayleigh fading is caused by the phase and amplitude of the reflected radio waves relative to the phase of a directly advancing wave being different, thus attenuating the radio message at the receiving end. If the receiver receives e.g. two signals propagated along two different paths, having phase difference of 180°, they cancel each other in the receiver, so that the signal weakens or disappears entirely. The last mentioned phenomenon, i.e. Doppler shift, is caused by the movement of a telephone, a vehicle or a reflecting object in relation to the transmitter and/or the receiver (e.g. base station), whereby both of the mean frequencies of the received reflected signal and of the directly propagated signal deviate from the mean frequency of the transmitted signal by a different amount and from a different direction. The accidental modulation caused by such changes results in a transmitted frequency being audible as unpleasant crackling or whistling by the user.

Owing to the great number of different factors affecting the propagation of a RF channel signal, particularly of a multipath channel, the RF channel has already to date been studied and simulated thoroughly. J. D. Parsons examines in his book The Mobile Radio Propagation Channel, Pentech Press Limited, London, (ISBN 0-7273-1316-9) the properties and simulation methods of the RF channel of a mobile station system. FIG. 6.9 on page 182 of the book demonstrates the scattering function of a radio signal within a range in which powerful multipath propagation occurs. The figure shows a vivid example of the relations between the received power, time delay and the Doppler shift. The figure demonstrates how a different Doppler shift occurs in different routes in the multipath circumstances, said shift being both positive and negative. According to Parsons, the dominating factors causing scattering can be identified by interpreting the Doppler shift as a function of the space angle of the received signal. Similarly, a physical image can be created on the propagation mechanisms in said range.

It is necessary, for instance, to be able to simulate the real properties of the radio path described above when testing the apparatus and in prototype tests using a reliable and realistic method corresponding to real life. A good testing means can thereafter be used also as a tool in developing new systems, coding and modulation methods, and in estimating the correction and diversity methods. When selecting a test method, typically a decision is made whether to use a program-based and/or hardware-based simulation. Various procedures are available for simulation both for narrow-band and wide-band channels.

A known simulator for a RF channel based on the use of an attenuator is presented in FIG. 1. A radio signal is coupled from the input in via an attenuator 11 to an attenuator 13 controlled by a fading generator 12. The output of attenuator 13 is coupled via an amplifier or an attenuator 14 to the output Out. An advantage of the simulator is that it is simple and inexpensive to manufacture, and when implemented passively it also operates in two directions. The design is appropriate for the simulation of fading by changing the attenuation of the attenuator 13 on the basis of the control 12. A drawback is that while being analogue it includes severe inaccuracies, and is not appropriate for simulation of multipath propagation or Doppler shift effects.

FIG. 2 presents a Doppler simulator in which the basic coupling is provided for the simulation of one propagation path, the dotted portion showing how by parallel coupling a simulator can be provided to simulate two propagation paths. Equally, a simulator for several propagation paths can be obtained by coupling several branches in parallel, each branch having different coefficients A and $\omega$. A radio signal is coupled from the input RFin into two branches, where the mixer 21 of branch 1 is controlled at frequency Fm developed by oscillator 24 and the mixer 22 of branch Q at the frequency Fm phase-shifted by the 90° phase shifting means 23. The mixing results 210 and 220 obtained from the mixers 21, 22 are filtered in low-pass filters 211 and 221, as the outputs of which the base-frequency carrier-wave vectors I (reference 212) and Q (reference 222) are produced. One propagation path is illustrated with the multiplier pairs 25 and 26, in which a signal of the propagation path is multiplied with the attenuation $A_1(t)$ of the propagation path and the Doppler shift of the frequency is illustrated by multiplying a signal of the I branch with $\cos(\omega_1 t)$ and a signal of the Q branch with $\sin(\omega_1 t)$. In other words, the combined effect of the attenuation $A_1$ and the Doppler shift $\omega_1$ is illustrated with coefficients $A_1\cos(\omega_1 t)$ and $A_1\sin(\omega_1 t)$. Respectively, the attenuation $A_2$ and the Doppler shift $\omega_2$ in the other branch are illustrated with coefficients $A_2\cos(\omega_2 t)$ and $A_2\sin(\omega_2 t)$. The signals entering along different branches are summed in adders 252 and 262 and multiplied in multipliers 27, 28 with mixing frequencies Fm and the 90° phase-shifted component Fm 90 thereof, and the outputs obtained from the mixers 27, 28 are summed in the adder 29, in the output OUT whereof the original RF input signal is thus produced, being attenuated with different propagation constants $A_1$ and $A_2$ and Doppler shifted by angle frequencies $\omega_1$ and $\omega_2$.

This kind of simulation of an RF channel implements the attenuations of different propagation paths and the Doppler frequencies of the carrier wave frequency. However, the Doppler shift produced in the modulation cannot be presented as a template, neither can the actual delay of the channel nor the delay difference of various propagation paths that is, the multiple delay spread. For such simulations a tapped filter structure is used and, if needed, is added into the I and Q components of each branch. An FIR structure showing the template of the multipath propagation is presented in FIG. 3. Therein, the I or Q component of each branch is coupled as an input signal 31 into a delay chain composed of N unit delays 32, in each whereof the signal is delayed by one unit delay $\tau$. The multipath propagation is illustrated by summing the delayed signals with different weight coefficients $a_0$–$a_N$ in the multipliers 33 and adder 34. The output of the tapped filter gives the input signal delayed by a plurality of different delays, each different delays weight by coefficients $a_0$–$a_N$.

By combining the designs of FIGS. 2 and 3, a multiple path—Doppler simulator for the RF channel can be implemented. The designs of FIGS. 2 and 3 can be combined as such or so that the multiplication corresponding to the Doppler shift is performed separately for each coefficient $a_0$ of the FIR branch shown in FIG. 3 and the separate multipliers 25 and 251, etc. of FIG. 2 are replaced with such FIR branches. Which of the combination designs is more advantageous to be implemented is dependent on how many multipath branches and how many FIR pins are provided in the simulator, and also how large are the Doppler shifts which it is desired to be simulated and at which precision the simulation is to take place. The method shown in FIGS. 2 and 3 is needed for simulating the effects of the multipath in currently used mobile phone systems, such as GSM (Global System for Mobile Communications), JDC (Japan Digital Cordless), ADC (American Digital Cellular), etc. Analogue inaccuracies are involved in the method, unless implemented prior to the DSP (Digital Signal Processing). The bandwidth is also confined to the range of 1 MHz.

An I/Q multipath simulator for an RF channel can be produced by coupling in parallel several of the apparatus shown in FIGS. 2 and 3. An advantage of said procedure is a good performance when the bandwidth or other factors are fixed and located in an appropriate range. The simulator can be implemented analogue or digital. Of the drawbacks, the great number of means and analogue inaccuracies may be mentioned, being caused by the conversion of the signals into I and Q components, equivalent to the simulator shown in FIG. 2. The implementation of such arrangement becomes difficult if the parameters are varied within a wide range.

With the FIR simulator as shown in FIG. 3 the radio channel can be simulated with the Doppler phenomenon also. This kind of simulator can be implemented either as a hardware design with a digital signal processor (DSP) or as a hard wired logic design. A drawback of the apparatus design lies in the great number of components required by several delay lines and multipliers, and moreover, this simulator must have a complicated algorithm for simulating Doppler shifts. With fixed delays the delay resolution accuracy is poor, and the unit delay $\tau$ corresponds to a Doppler shift corresponding to movement speeds over 100 m/s. This can be reduced to some extent so that instead of whole delay steps, the signal is delayed by changing the weight coefficients ai in the FIR block so that instead of the signal being delayed by one delay unit, it is slightly deformed and delayed by only a fraction of the tap delay. If, e.g. the weight factors are expressed with 10 bits, a delay resolution of T/10 to T/50 is achievable. If a tapping delay is e.g. 50 ns, and the signal is expressed to an accuracy of 10 bits or 1000 levels and the output is allowed to deform so that it is accurate to within 20 signal levels or $\frac{1}{50}$th of the original, the smallest shift of the apparent time axis of the output signal is approximately 1 ns, which is too long, considering a Doppler simulation in practice. This is achievable only if the tapping factors are changed at the sampling frequency. This results in a complex structure with fast multipliers and a high power consumption. Therefore, each branch would require a separate Doppler shift unit, as in FIG. 2, and correspondingly, more computation. In the preceding example, the carrier wave $f_c$ and the modulation are dealt with as differing from one another.

It is frequently necessary to examine also the impact of the propagation delay of a radio wave on the functioning of the system. For instance, the control of the radio volume between a fixed base station and a mobile subscriber apparatus needed in a Code Division Multiple Access (CDMA) communication depends both on the features of the RF channel described above (attenuation, multipath propagation) and on the actual propagation delay of the RF channel, which the simulators described above were not able to produce.

BRIEF SUMMARY OF THE INVENTION

A first aspect of the present invention provides a method for simulating an RF propagation channel, comprising:

inputting an RF signal (fin) to a simulator;

sampling the RF signal and writing a sample to a memory means at a write frequency (fw);

storing said sample in the memory means; and reading the sample from the memory means at a read frequency ($f_{Ri}$) after a delay time ($t_{di}$) from writing the sample to the memory means;

wherein the delay time ($t_{di}$) corresponds to a delay for the RF propagation channel and the difference between the write frequency (fw) and the read frequency ($f_{Ri}$) corresponds to a Doppler shift in the frequency of the RF signal (fin) for the propagation channel. A second aspect of the present invention provides apparatus for simulating an RF propagation channel, comprising;

input means for receiving an RF signal;

sampling means for sampling the RF signal and writing a sample to a memory means at a write frequency (fw) and coupled to the output of said input means; and coupled to the memory means reading means for reading the sample from the memory means after a time ($t_{di}$) from writing the sample to the memory means at a read frequency ($f_{Ri}$).

A method and apparatus in accordance with the invention has the advantage that it renders simulation of various channel attenuations, multiple access propagation, Doppler shift both in a carrier wave and in modulation possible, and finally, also the real propagation delay of the radio path. A design in accordance with the invention, provides a simple simulator which is quick and easy to construct and with which a channel of wide band-width, e.g. 100 MHz, can be simulated.

A typical use of said simulator includes simulation of multipath propagation of a radio signal, which in an implementation of the simulator means a plurality of tappings. With the simulator, continuously changing attenuations, delays and continuously changing Doppler shifting of the different propagation routes can be simulated.

A channel simulator based on the use of sampled real-time memories can be briefly described as below. Therewith a channel can be simulated in real time on a wide bandwidth. The simulation algorithm of a varying real-time channel comprises e.g. a delay and a Doppler shift which can be carried directly into each branch corresponding to the propagation path of the radio wave. The simulating radio signal is presented by means of carrier wave and modulation vectors which are provided by taking samples at a lower frequency $f_w$.

Each channel propagation path i is simulated with a memory chain in which the samples representing a radio signal are written in at write frequency $f_w$ and read at read frequency $f_{Ri}$:

$$f_{Ri} = f_w * \left(1 - \frac{V_i}{c}\right) \quad (1)$$

here $v_i$ refers to a change in the length of the propagation path of the radio connection per time unit, or the speed component of the mobile station in the input direction of the propagation path i, as shown in FIG. 4, and c is the speed of light. Sample writing is started as soon as the signal enters the input of the simulator, and the reading from the first sample after the delay $t_{di}$ of the propagation path. The read samples are weighted with the value $A_i(t)$ of the relative attenuation of the propagation path.

The write and read frequencies $f_w$ and $f_{Ri}$ can be formed e.g. with an IDPLL synthesizer circuit, disclosed in the Finnish patent No. 87032: "Interpolating PLL frequency synthesizer (IDPLL, integrated digital phase locked loop)". With the IDPLL synthesizer disclosed in the patent read and write frequencies can be produced to be very close to one another. The small frequency steps can be implemented utilizing the internal logic of the synthesizer.

With a channel simulator of an RF channel based on sampled, real-time use of delay memories, it is possible to achieve the true real-time simulation of the radio channel; and an entire apparatus design based on rather inexpensive memory technique, not requiring any apparatus-based arithmetics, particularly any multiplication. Heretofore, such features have not been present in prior art simulators.

DETAILED DESCRIPTION OF EMBODIMENTS OF THE INVENTION

Figure 1:
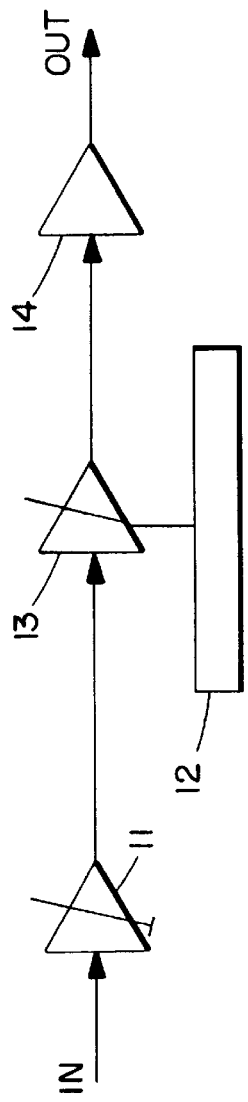
FIG. 1 presents a prior art simulator based on the use of an attenuator.
Figure 2:
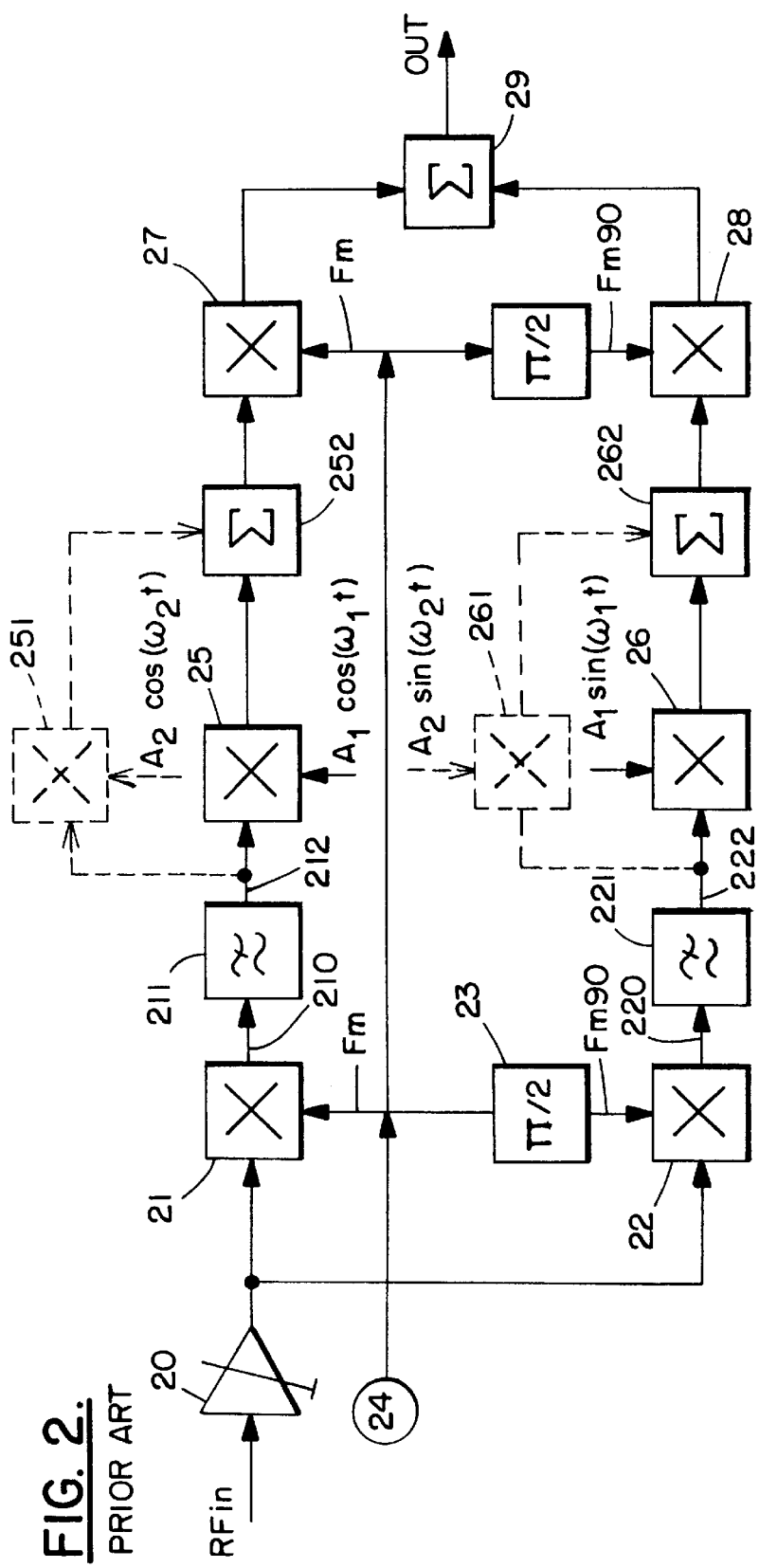
FIG. 2 presents a Doppler simulator known in the art.
Figure 3:
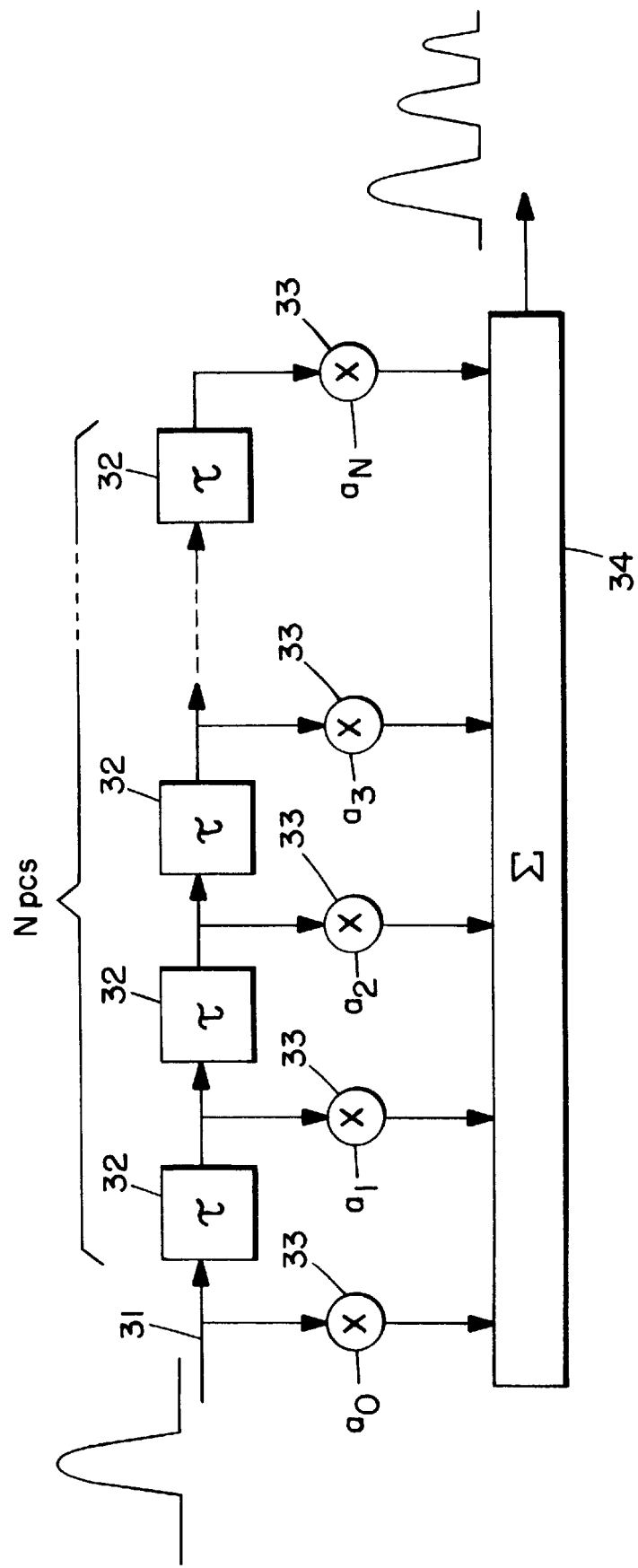
FIG. 3 presents the structure of a FIR simulator known in the art.
Figure 4:
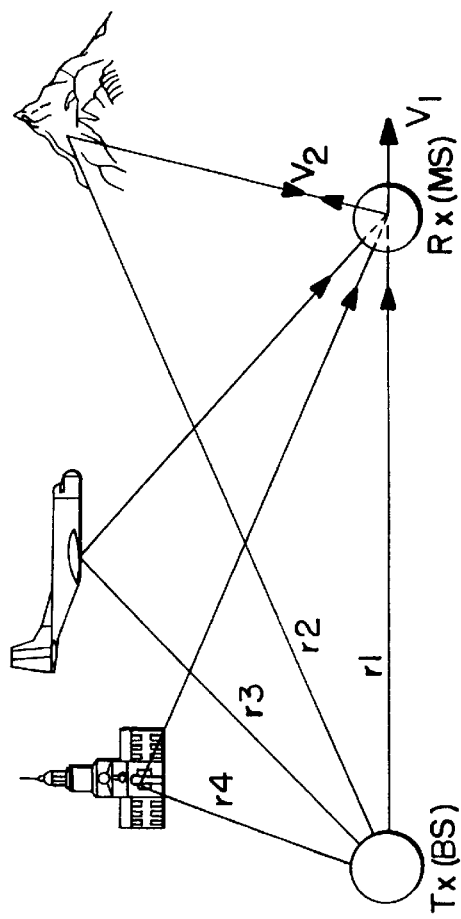
FIG. 4 presents schematically an RF channel between the transmitter and the receiver to be simulated, in which multipath propagation occurs.

A purpose simulator in accordance with the invention simulates e.g. the situation presented by FIG. 4, in which a signal transmitted by a radio transmitter Tx, for instance by a base station BS, propagates along several routes r1 to r4 to the receiver Rx, e.g. mobile station MS. The r2 to r4 signals being reflected from a mountain, rock, aeroplane or a building and the r1 signal being a direct propagation route. In the present example the base station BS is fixed and the mobile station MS is mobile. As described previously, motion generates a Doppler shift of e.g. a received signal. Other interferences are, inter alia, the different relative attenuations $A_i(t)$ of different routes, and the lengths thereof, causing various delays in different signals r1–r4. in a simulator in accordance with the invention, the simulation of different routes or part of such simulations are implemented in a number of parallel branches, but for the sake of clarity only one thereof is presented in the figures.

Figure 5:
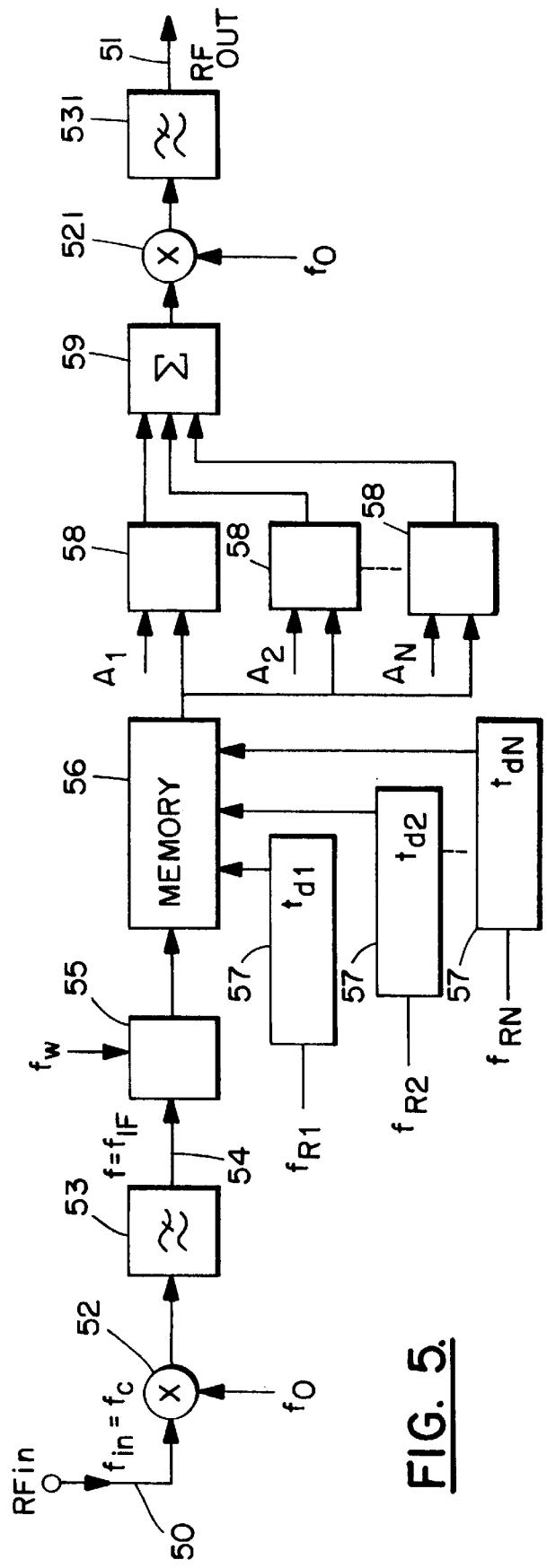
FIG. 5 presents a block diagram of the overall structure of a circuit in accordance with the invention.

A circuit diagram of apparatus in accordance with the invention is presented in FIG. 5.

In FIG. 5, an RF signal 50 at carrier wave frequency $f_c$ is converted in a mixer 52 and in a lowpass or band-pass filter 53 following thereafter to a lower average frequency $f_{IF}$ such that the bandwidth of the input signal is converted unchanged above the zero frequency.

Thus, the intermediate frequency signal 54 includes both modulation containing information and a carrier wave not containing information, wherefrom samples are taken at a frequency $f_{wi}$ in a sampling unit 55 and written in the memory 56. After a propagation delay $t_{di}$ of the propagation path i of the channel, samples are started to be read from the memory at read frequency $f_{Pi}$ controlled by the read unit 57 in the same order as written in the memory 56. The samples thus read are reconstructed and weighted with factor $A_i(t)$, whereby a signal of $f_{IFi}$ average frequency is produced, which by mixing with frequency $f_0$ in the mixer 521 and by selecting a desired component therefrom in filter 531 constitutes an output signal 51 corresponding to one propagation path. For the average frequency the doppler shifted signal is in accordance with;

$$f_{ci} = f_c\left(1 - \frac{V_i}{c}\right),$$

and

The relationship between $F_{Ri}$ and $F_w$ is given by $$f_{Ri} = f_w * \left(1 - \frac{V_i}{c}\right)$$

where $f_c$ refers to the average frequency of the input signal (carrier wave frequency), $v_i$ is the speed component of the radio apparatus determined according to FIG. 4 in the direction of the propagation path i and c is the speed of light. Since the contents of the memory 56 include both a modulation and a carrier wave, the Doppler shift implemented by means of the difference of the write frequency $f_w$ and the read frequency $f_{Ri}$ of the samples has an equal impact both on the carrier wave and the modulation. When simulating a great number of different propagation paths, the write frequency $f_w$ of the samples is always the same but for each propagation path i a typical propagation delay $t_{di}$, attenuation $A_i$ as the function of time and the read frequency $f_{Ri}$ exists. To simulate a multipath propagation, reading from the memory 57 and the weighted reconstruction of the samples into an intermediate signal for unit 58 is performed for each of N propagation paths separately and the signals corresponding to the different propagation paths are summed in adder 59. Summing the signals corresponding to different propagation paths as digital samples prior to the reconstruction of the intermediate frequency signal in unit 58 or as intermediate frequency signals (as shown in FIG. 5) is an option for the user. Additionally, all propagation paths can be provided with a common or a separate memory. A common memory 56 in which it is possible to write via one port and read via a number of ports at different read frequencies $f_{Ri}$, is naturally an ideal solution.

Figure 6:
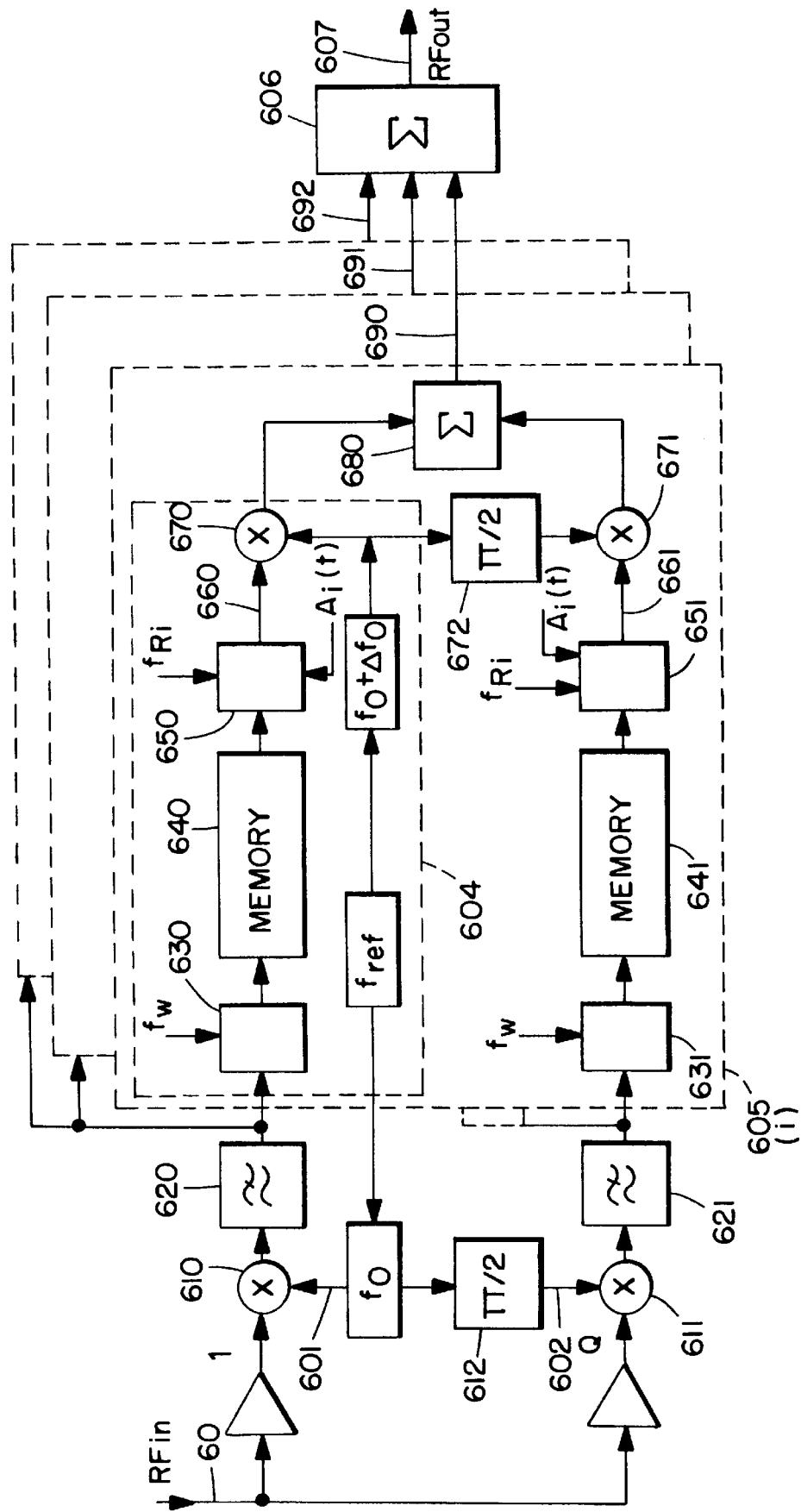
FIG. 6 presents a block diagram of the overall structure of a circuit in accordance with the invention, presenting division of the simulator into I and Q branches.

Since the carrier wave $f_c$ contains no information, it can be eliminated by converting the input signal $f_c$ to a mean signal $f_B$ lower than the bandwidth of the signal, typically to zero frequency, and returned to the output signal with the Doppler shift separately. Now, in order to illustrate the modulation, a component I at the mixing frequency and a component Q being in the 90 degree phase shift therewith need to be derived from the carrier wave. This is the procedure carried out in FIGS. 6 and 7, FIG. 6 whereof presenting the general structure of the simulator and FIG. 7 the structure of one branch. In FIG. 6 the input signal 60 having an average frequency of $f_c$, is divided into I and Q branches, respective I and Q signals being multiplied in the multiplier 610 of the I branch with a $f_0$ mixing frequency signal and in the Q branch, in the multiplier 611 with the 90 degrees phase-shifted signal 602 at $f_0$ mixing frequency. After the low-pass filtering 620 and 621 there is a signal in the I branch $$I(t) = U_{in} e^{j2\pi(f_c - f_0) + j\varphi(t)} \quad (2)$$

and in the Q branch $$Q(t) = U_{in} e^{j2\pi(f_c - f_0) + j(\varphi(t) + \pi/2)} \quad (3)$$

When the carrier wave frequency is equal to the mixing frequency, that is, $f_c = f_0$, and the other information, i.e. modulation, is included in $\varphi(t)$, the scalar real parts of the equations (2) and (3) are $$I(t) = U_{in} \cos(\varphi(t)) \quad (4)$$

$$Q(t) = U_{in} \sin(\varphi(t)) \quad (5)$$

in other words, the I and Q components contain data on the carrier wave amplitude of the incoming signal, and on the phase, that is the modulation, but not the carrier wave itself. The modulation is around the zero frequency, i.e. at the base-frequency. From the low-pass filtered modulation components I and Q, samples are taken at write frequency $f_w$ in sampling units 630 and 631 and they are written in the memories 640 and 641. The sampling frequency $f_w$ is created by deriving it from the same reference frequency $f_{ref}$ as from which the mixing frequency $f_0$ is derived. In branch i shown in FIG. 6, samples are started to be read after the propagation delay $t_{di}$ at read frequency $f_{Ri}$, for which the equation (1) is in force, in read units 650 and 651, and they are weighted with factor $A_i(t)$. The read frequency $f_{Ri}$ is also derived from the reference frequency $f_{ref}$. Due to the difference between the Doppler shifted and the write frequency $f_w$ and the read frequency $f_{Ri}$, the modulation signal is Doppler shifted, and the weighted modulation components 660 in branch I and 661 in branch Q are multiplied in multipliers 670 and 671 with the Doppler shifted frequency $f_{\Delta i} = f_0 + \Delta f_0$ and with the 90 degrees phase shifted components, whereby $$f_{\Delta i} = f_0(1 - v_i/c) \text{ and} \quad (6)$$

$$\Delta f_0 = f_0 v_i / c_1 \quad (7)$$

and are summed in an adder 680, as a result of which an attenuated, delayed and genuinely Doppler-shifted carrier wave 690 having the modulation signal imposed thereon, and corresponding to one propagation path i is produced. By repeating the structures within the broken line 605 for each propagation path and by summing the signals 690, 691, 693, etc. corresponding to the different propagation paths in adder 606, an apparatus genuinely simulating Doppler shifts and channel delays can be produced.

Figure 7:
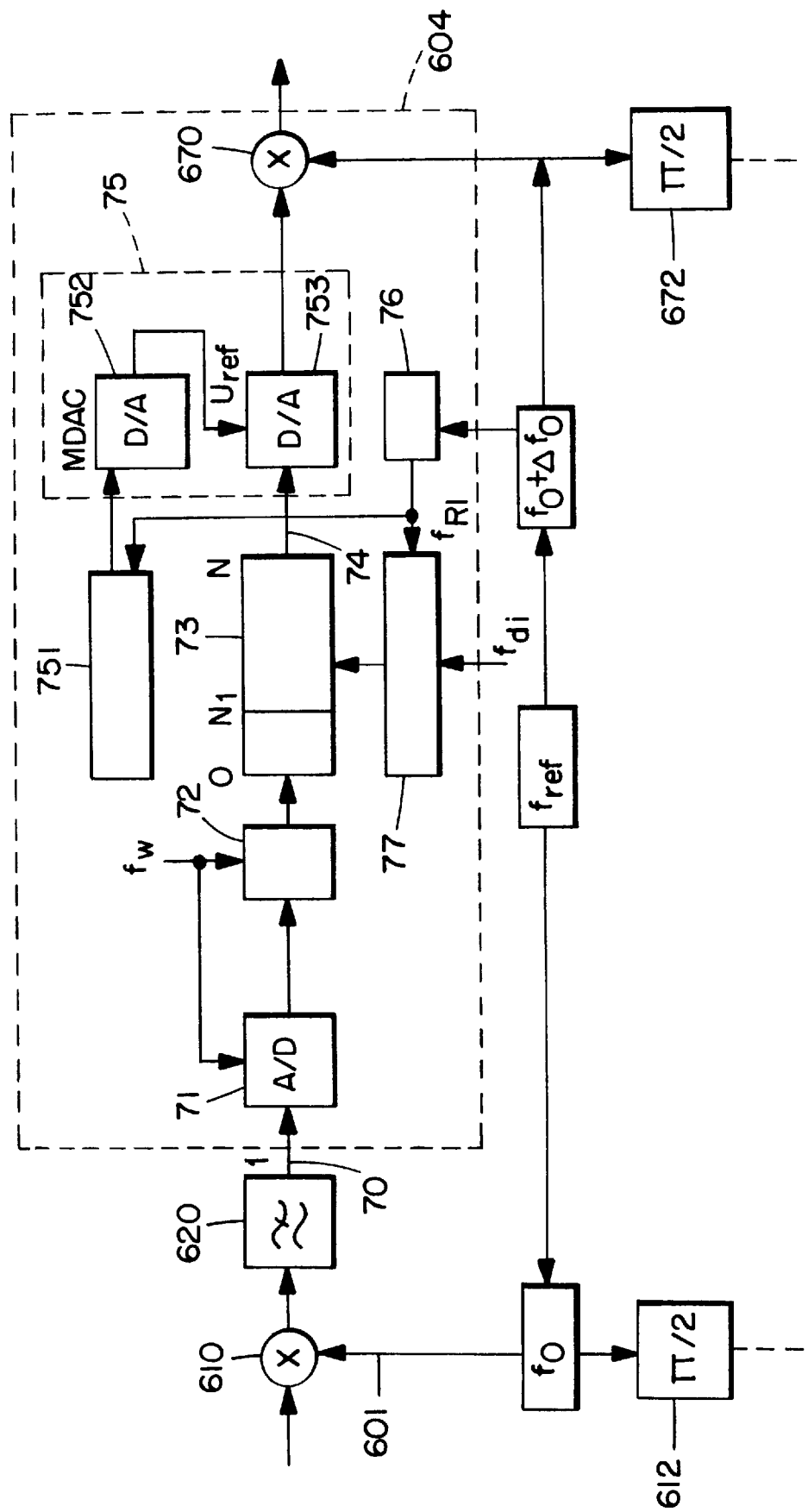
FIG. 7 presents a block diagram of a more detailed structure of a branch of a circuit in accordance with the invention, simulating one propagation path.

FIG. 7 presents the operations of the I component of one propagation path within the broken line 604 of FIG. 6. The operations of the Q component are otherwise the same, but therein the mixing frequencies $f_0$ and $f_0 + \Delta f_i$ are at 90 degree phase shift relative to the mixing frequencies of the I component.

A base-frequency signal I (70) is converted in to a digital signal in an A/D converter 71 at a sampling frequency $f_w$ and the samples are written in to the channel memory 73 starting from the memory location $N_1$ with the aid of the address logic 72. When a period of time $t_{d1}$ representing the propagation delay has passed from the first writing of the sample, reading out of samples is started at a frequency $f_{Ri}$ from the memory location $N_1$ onwards. The size of the channel memory is N memory locations being addressed cyclically, i.e. after the last memory location N the addressing is continued automatically starting from the first location of the channel memory O. Since the length of the memory corresponds to the greatest assumed propagation delay of the channel, writing in the memory and reading from the memory cannot collide in any other case except when simulating the radio apparatus physically touching each other.

The samples 74 read from memory are converted back in a multiplying digital to analog converter MDAC 75 to which a desired attenuation $A_i(t)$ is derived from the channel to form the input as a function of time from the attenuation control unit 751 in which the attenuation as a function of time is either stored or computed from channel parameters stored therein. FIG. 7 shows an MDAC, used for a preferred embodiment, in which for the converter 752 a reference voltage $U_{ref}$ for a second converter 753 is formed, the output whereof being the input of the reference voltage $U_{ref}$ and the digital word 74 arriving at the converter.

Figure 8:
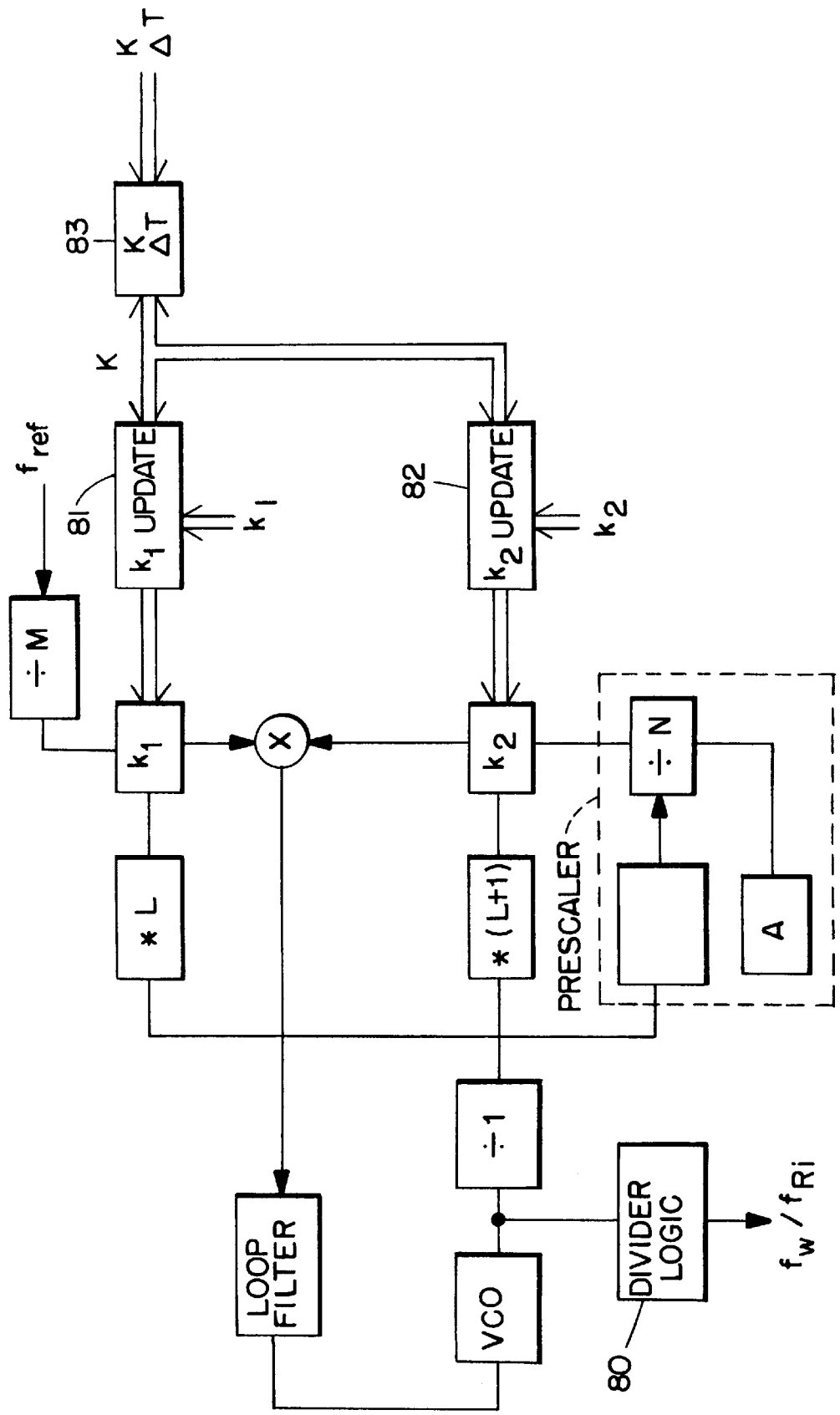
FIG. 8 presents a block diagram of a circuit for forming a read and write frequency in accordance with the invention.

The frequency $f_{Ri}$ controlling the reading from the memory, simultaneously controlling the timing of the attenuation $A_i(t)$, is produced with divider structures 76 from the same time base as $f_0 + \Delta f_0$. Reading from the memory is conducted with the aid of the address logic 77 after the delay $t_{di}$ fed thereto from the storage in the memory. By using the frequency interpolation method referred to in the foregoing, frequencies $f_0 + \Delta f_0$ can easily be produced, in which $\Delta f_0/f_0 = 10^{-8}$ to $10^{-6}$, as prerequired by the realistic propagation rates of the radio apparatus. In FIG. 8 the formation of frequencies $f_0$ and $f_0 + \Delta f_0$ is described with the aid of patent specification U.S. Pat. No. 5,079,520 and the patent specification FI-87032 equivalent thereto. Said patent specifications disclose that the phase lock is in locked state at frequency $$f_{vco} = f_0 = \frac{f_{ref}}{M}\left(PN + A + \frac{k_1}{L} - \frac{k_2}{L+1}\right)$$

where $k_1$ and $k_2$ are the integers with which the pulses of the VCO and reference branches are delayed in each phase comparison cycle. Furthermore, by changing, according to said patent specifications, the coefficients $k_1$ and $k_2$ by value K once, this results in a phase change in the VCO frequency of the output of the synthesizer, being in magnitude $$\Delta \phi = \frac{2\pi kT}{L(L-1)} \quad (8)$$

where the integer I is the ratio of the VCO frequency and the frequency of the delay units, for instance being typically about 50 for 900 MHz frequencies. While implementing said phase changes regularly at ΔT time intervals, the following frequency difference is formed in the VCO frequency:

$$\Delta f_0 = \frac{1}{2\pi} \frac{\Delta \phi}{\Delta T} = \frac{kI}{L(L+1)\Delta T} \quad (9)$$

For a typical IDPLL/MDPLL synthesizer, I=64, L=63, so that by selecting for the exemplary values ΔT=1 ms, and K=1, $\Delta f_0 = 10^3/63 = 16$ Hz would be achieved, which at 900 MHz frequency corresponds to Doppler speed 3 m/s.

The desired read frequency $f_{Ri}$ can be formed in the present invention with divider 76 (FIG. 7) so that $$\frac{f_0 + \Delta f_0}{f_0} = \frac{f_{Ri}}{f_w} \quad (10)$$

A simple method for forming a write frequency $f_w$ and read frequencies $_{Ri}$ is the division of the output of the voltage controlled oscillators (VCO) used in forming $f_0$ and $f_0 + \Delta f_0$. To achieve a desired VCO frequency ($f_0$, $f_0 + \Delta f_0$), the values A, N, M, $k_1$ and $k_2$ are conducted to the synthesizer, whereas L, L+1 and I are the values typically implemented in the design of the synthesizer. For a frequency deviation $\Delta f_0$ according to equation (9), to the units 81 and 82 controlling the updating of the coefficients $k_1$ and $k_2$, numeral K is conveyed at logic 83 as additional control at ΔT intervals.

Therefore, with the apparatus as shown in FIGS. 6–8 or 5, the full resemblance to a true channel is achieved in the radio channel simulation, and resulting from the operation without signal multiplications, an advantageous implementation, and a sampling rate of an order of magnitude higher than in multiplier based Implementations with multipliers can be implemented. Whether the design at an intermediate frequency as shown in FIG. 5 is utilized or whether a design implementing a separate base band frequency according to FIG. 6 and an RF/Doppler shift, depends on the detailed requirements set for the apparatus and on the availability of different types of components. As examples of such it should be mentioned that the availability of integrated I and Q mixers (e.g. blocks 670–672 and 610–612, FIG. 6) provided with a 90 degree phase shift favour the design of FIG. 6.

As regards particular embodiments it should be mentioned that A/D and D/A converters, memories and adders with which 200 million samples per second can be processed are available. Therewith, a good simulator processing 0–50 MHz base-frequency signals can be implemented, according to FIG. 6, or a design according to FIG. 5, with intermediate frequency of $f_{IF}$=70 MHz and the frequency of the signal being 45–95 MHz, in other words, it is provided with a 50 MHz bandwidth, which is greater by almost an order of magnitude than what can be achieved with the complex multiplication circuits representing an equal technological level. If e.g. 100 μs is desired to be set for the channel delay, the size of one memory block, at sample speed of 200 million samples per second, would have 20,000 memory locations, which is also easy to implement.

Thus, the design introduced here offers for the simulation of a channel a good, and compared with prior art designs, a better design regarding performance and implementation. When the other prior art parts of a RF channel simulator are added in the basic design of the present invention, such as attenuators, control units, etc., a well-functioning apparatus is achieved.

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

For example, instead of the IDPLL synthesizer shown above in FIGS. 7 and 8, also a DDS synthesizer (digital direct synthesis) could be used. However, a bandwidth sufficient for simulating the data in the particular system e.g. code division multiple access (CDMA) system should be obtainable by the synthesizer.

What I claim is:

1. A method for simulating an RF propagation channel, comprising the steps of:
    inputting an RF signal (fin) to a simulator;
    sampling the RF signal and writing a sample to a memory means at a write frequency (fw);
    storing said sample in the memory means; and
    reading the sample from the memory means at a read frequency ($f_{Ri}$) after a delay time ($t_{di}$) from writing the sample to the memory means;
    wherein the delay time ($t_{di}$) corresponds to a delay for the RF propagation channel and the difference between the write frequency (fw) and the read frequency ($f_{Ri}$) corresponds to a Doppler shift in the frequency of the RF signal (fin) for the propagation channel.

2. A method according to claim 1, wherein the RF signal (fin) is down converted to a lower frequency ($f_{IF}$; $f_B$) and said sample is taken from the lower frequency ($f_{IF}$; $f_B$).

3. A method according to claim 2 for simulating a multipath propagation channel, wherein the sample is read from the memory means after different delay times (tdi) from writing the sample corresponding to the delay for different paths (i) and the read frequency ($f_{Ri}$) is different for different propagation paths (i).

4. A method according to claim 3, wherein signals representing different propagation paths (i) are combined by summing, and
    a signal obtained as the result of summing is up converted to an input RF frequency range.

5. A method according to claim 4, wherein prior to summing the signals representing different propagation paths (i), a signal representing each propagation path (i) is weighted with a coefficient corresponding to a relative attenuation ($A_i(t)$) of each propagation path (i).

6. A method according to claim 3, wherein
    signals representing different propagation paths (i) are up converted to an input RF frequency range, and
    said RF signals are combined by summing.

7. A method according to claim 6, wherein prior to up converting the signals representing different propagation paths (i) to the input RF frequency range, a signal representing each propagation path (i) is weighted with a coefficient corresponding to a relative attenuation ($A_i(t)$) of each propagation path (i).

8. A method according to claim 2, wherein the RF signal (fin) is transferred substantially to zero frequency ($f_B$) in the form of components (I,Q) phase-shifted relative to each other by 90 degrees.

9. A method according to claim 2, wherein the write frequency ($f_w$) and the read frequency ($f_{Ri}$) are adapted such that the ratio ($f_{Ri}/f_w$) is of the same size as the ratio ($f_0+\Delta f_{0i}/f_{0i}$) of the carrier wave frequency ($f_0=f_c$) of the radio signal (fin) and of the frequency ($f_0+\Delta f_{0i}$) moved therefrom by the Doppler shift.

10. A method according to claim 1, wherein the RF signal ($f_{in}$) to be simulated includes both a carrier wave and a modulation signal superimposed thereon.

11. Apparatus for simulating an RF propagation channel, comprising:

input means for receiving an RF signal;

sampling means for sampling the RF signal and writing a sample to a memory means at a write frequency (fw) and coupled to the output of said input means;

coupled to the memory means reading means for reading the sample from the memory means after a time ($t_{di}$) from writing the sample to the memory means at a read frequency ($f_{Ri}$); and mixing and filtering means for down converting the RF signal (fin) to a lower frequency ($f_{IF}$; $f_B$), and sampling means for sampling the lower frequency ($f_{IF}$); $f_B$).

12. Apparatus according to claim 11 for simulating a multipath propagation channel, wherein there are provided means for forming a plurality of delay times (tdi) each corresponding to respective propagation paths (i) and means for generating a plurality of read frequency ($f_{Ri}$) corresponding to respective propagation paths (i), respective propagation paths (i) being provided with respective memory means each storing said sample therein for delaying by respective times (tdi) and reading from at respective frequencies ($f_{Ri}$).

13. Apparatus according to claim 12, wherein there is provided an adder for summing the sample or analogue signals for each propagation path for simulation into one signal.

14. Apparatus according to claim 11, wherein there are provided means for weighting the sample read from the memory with a coefficient ($A_i(t)$) corresponding to a channel or propagation path attenuation.

15. Apparatus according to claim 11, wherein there are provided means (75) for converting the sample read from a memory into an analogue signal.

16. Apparatus according to claim 15, wherein the means for converting the samples into an analogue signal include a multiplying digital/analogue converter.

17. Apparatus according to claim 11, wherein the means for forming said write frequency ($f_w$) and said read frequencies ($f_{Ri}$) comprise an interpolating PLL frequency synthesizer.

18. A method for simulating an RF propagation channel, comprising the steps of:

sampling an RF signal and storing digital samples thereof in a memory, the samples being stored at a first frequency; and reading the stored digital samples from the memory at a second frequency; wherein a delay between storing a digital sample and reading the stored digital sample is a function of a path delay of the RF signal for the simulated RF propagation channel; and wherein a difference between the first frequency and the second frequency is a function of a Doppler shift in a frequency of the RF signal for the simulated RF channel.

19. A method as set forth in claim 18, wherein the step of sampling includes an initial step of down converting the RF signal.

* * * * *